US009833774B2

(12) United States Patent
Santos Castro et al.

(10) Patent No.: US 9,833,774 B2
(45) Date of Patent: Dec. 5, 2017

(54) PROCESS FOR SYNTHESIZING IRON CARBIDE FISCHER-TROPSCH CATALYSTS

(71) Applicant: Dow Global Technologies LLC, Midland, MI (US)

(72) Inventors: Vera P. Santos Castro, Terneuzen (NL); Adam Chojecki, Ghent (BE); Garmt R. Meima, Terneuzen (NL); Adrianus Koeken, Terneuzen (NL); Matthijs Ruitenbeek, Terneuzen (NL); Thomas Davidian, Ghent (BE); Gascon Jorge, Utrecht (NL); Michiel Makkee, Rochanje (NL); Freek Kapteijn, Purmerend (NL); Tim A. Wezendonk, Koog Ann De Zaan (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/300,139

(22) PCT Filed: May 14, 2015

(86) PCT No.: PCT/US2015/030739
§ 371 (c)(1),
(2) Date: Sep. 28, 2016

(87) PCT Pub. No.: WO2015/175759
PCT Pub. Date: Nov. 19, 2015

(65) Prior Publication Data
US 2017/0173565 A1 Jun. 22, 2017

Related U.S. Application Data

(60) Provisional application No. 61/994,277, filed on May 16, 2014.

(51) Int. Cl.
*B01J 23/78* (2006.01)
*B01J 37/08* (2006.01)
*B01J 37/02* (2006.01)
*B01J 35/02* (2006.01)

(52) U.S. Cl.
CPC ............. *B01J 23/78* (2013.01); *B01J 35/023* (2013.01); *B01J 37/0201* (2013.01); *B01J 37/086* (2013.01)

(58) Field of Classification Search
CPC ........ B01J 23/78; B01J 23/745; B01J 35/023; B01J 37/0203; B01J 37/086
USPC ......... 502/177, 185; 518/715, 717, 719, 721
See application file for complete search history.

(56) References Cited

U.S. PATENT DOCUMENTS

| | | | |
|---|---|---|---|
| 8,293,675 B2 | 10/2012 | Kotrel et al. | |
| 9,234,871 B2 * | 1/2016 | Fleischer | G01N 27/4143 |
| 2010/0273642 A1 * | 10/2010 | Chang | B01J 31/069 |
| | | | 502/167 |
| 2011/0172412 A1 * | 7/2011 | Serre | C07C 7/13 |
| | | | 540/145 |
| 2012/0049110 A1 | 3/2012 | Trukhan et al. | |
| 2012/0259026 A1 | 10/2012 | Torres Galvis et al. | |
| 2013/0184456 A1 * | 7/2013 | Zaworotko | C07F 15/065 |
| | | | 540/145 |
| 2014/0212944 A1 * | 7/2014 | Tian | B82Y 30/00 |
| | | | 435/180 |
| 2014/0360917 A1 * | 12/2014 | Park | C10G 2/332 |
| | | | 208/14 |
| 2015/0340705 A1 * | 11/2015 | Tylus | H01M 4/88 |
| | | | 429/531 |
| 2016/0107144 A1 * | 4/2016 | Davidian | C07C 1/044 |
| | | | 518/717 |
| 2016/0121311 A1 * | 5/2016 | Davidian | C10G 2/332 |
| | | | 518/717 |

FOREIGN PATENT DOCUMENTS

| | | | | |
|---|---|---|---|---|
| CA | 2826510 A1 | | 8/2012 | |
| CN | 10-5536835 | * | 5/2016 | ............. B01J 27/22 |
| WO | 2013/076742 A1 | | 5/2013 | |

OTHER PUBLICATIONS

"Non-precious electrocatalysts synthesized from metal-organic frameworks," Foroughazam Afsahi et al. Journal of Materials Chemistry A, 2014, 2, pp. 12270-12279.*
"Iron oxide functionalised MIL-101 materials in aqueous phase selective oxidations," Alina Mariana Balu et al. Applied Catalysis A: General 455 (2013), pp. 261-266.*
"Iron(III) metal-organic frameworks as solid Lewis acids for the isomerization of a-pinene oxide," Amarajothi Dhakshinamoorthy et al. Catalysis Science & Technology, 2012, 2, pp. 324-330.*
"A dual-metal-organic-framework derived electrocatalyst for oxygen reduction," Bu Yuan Guan et al. Energy & Environmental Science, 2016, 9, pp. 3092-3096.*
"A new synthesis of carbon-encapsulated Fe5C2 nanoparticles for high-temperature Fischer-Tropsch synthesis," Seok Yong Hong et al. Nanoscale, 2015, 7, pp. 16616-16620.*

(Continued)

*Primary Examiner* — Patricia L. Hailey

(57) ABSTRACT

Preparation of a catalyst suitable for use in Fischer-Tropsch Synthesis reactions using a two step process in which the steps may be performed in either order. In step a), impregnate an iron carboxylate metal organic framework selected from a group consisting of iron-1,3,5-benzenetricarboxylate (Fe-(BTC), Basolite™ F-300 and/or MIL-100 (Fe)), iron-1,4 benzenedicarboxylate (MIL-101(Fe)), iron fumarate (MIL-88 A (Fe)), iron-1,4 benzenedicarboxylate (MIL-53 (Fe)), iron-1,4 benzenedicarboxylate (MIL-68 (Fe)) or iron azobenzenetetracarboxylate (MIL-127 (Fe)) with a solution of a promoter element selected from alkali metals and alkaline earth metals. In step b) thermally decompose the iron carboxylate metal organic framework under an inert gaseous atmosphere to yield a catalyst that is a porous carbon matrix having embedded therein a plurality of discrete aliquots of iron carbide. If desired, add a step intermediate between steps a) and b) or preceding step b) wherein the metal organic framework is impregnated with an oxygenated solvent solution of a polymerizable additional carbon source and the polymerizable additional carbon source is thereafter polymerized.

20 Claims, No Drawings

(56) References Cited

OTHER PUBLICATIONS

"Hydrocarbon oxidation over Fe- and Cr-containing metal-organic frameworks MIL-100 and MIL-101—a comparative study," Oxana A. Kholdeeva et al. Catalysis Today 238 (2014), pp. 54-61.*
"Alkylation of benzene over Fe-based metal organic frameworks (MOFs) at low temperature condition," Ehsan Rahmani et al. Microporous and Mesoporous Materials 249 (2017), pp. 118-127.*
"Structural and elemental influence from various MOFs on the performance of Fe@C catalysts for Fischer-Tropsch synthesis," Tim A. Wezendonk et al. Faraday Discussions, 2017, 197, pp. 225-242.*
"Nitrogen-doped 3D porous carbons with iron carbide nanoparticles encapsulated in graphitic layers derived from functionalized MOF as an efficient noble-metal-free oxygen reduction electrocatalysts in both acidic and alkaline media," Juanhong Xue et al. RSC Advances, 2016, 6, pp. 110820-110830.*
"Synthesis of mesoporous carbons with narrow pore size distribution from metal-organic framework MIL-100(Fe)," Xinlong Yan et al. Microporous and Mesoporous Materials 234 (2016), pp. 162-165.*
"Controlled Reducibility of a Metal-Organic Framework with Coordinatively Unsaturated Sites for Preferential Gas Sorption," Ji Woong Yoon et al. Angew. Chem. Int. Ed., 2010, 49, pp. 5949-5952.*
"Fe/Fe3C@N-doped porous carbon hybrids derived from nanoscale MOFs: robust and enhanced heterogeneous catalyst for peroxymonosulfate activation," Tao Zeng et al. Catalysis Science & Technology, 2017, 7, pp. 396-404.*
"Metal-organic framework-derived hybrid of Fe3C nanorod-encapsulated, N-doped CNTs on porous carbon sheets for highly efficient oxygen reduction and water oxidation," Pingping Zhao et al. Catalysis Science & Technology, 2016, 6, pp. 6365-6371.*
Jeffrey P. Bosco, et al., Synthesis and Characterization of Three-Dimensionally Ordered Macroporous (3DOM) Tungsten Carbide: Application to Direct Methanol Fuel Cells, Chemistry of Materials, 2010, pp. 966-973, vol. 22.
Jasmin Blanchard, et al., Fischer-Tropsch Synthesis in a Slurry Reactor Using a Nanoiron Carbide Catalyst Produced by a Plasma Spray Technique, Industrial & Engineering Chemistry Research, 2010, pp. 6948-6955, vol. 49.
Yu. V. Fedoseeva, et al. Effect of oxidation and heat treatment on the morphology and electronic structureof carbon-encapsulated iron carbide nanoparticles, Materials Chemistry and Physics, 2012, pp. 235-240, vol. 135.
Song-Hai Chai, et al., Graphitic mesoporous carbon-supported molybdenum carbides for catalytic hydrogenation of carbon monoxide to mixed alcohols, Microporous and Mesoporous Materials, 2013, pp. 141-149, vol. 170.

Hyun G. Yun, et al., Study of iron/mordenite catalysts by Mossbauer and ferromagnetic resonance spectroscopy for carbon monoxide hydrogenation, Applied Catalysis, 1991, pp. 97-116, vol. 68.
Suk-Hwan Kang, et al., ZSM-5 supported iron catalysts for Fischer-Tropsch production of light olefin, Fuel Processing Technology, 2010, pp. 399-403, vol. 91.
Hendrik J. Schulte, et al., Nitrogen- and Oxygen-Functionalized Multiwalled Carbon Nanotubes Used as Support in Iron-Catalyzed, High-Temperature Fischer-Tropsch Synthesis, ChemCatChem , 2012, pp. 350-355, vol. 4.
E.P. Sajitha, et al., Synthesis and characteristics of iron nanoparticles in a carbon matrix along with the catalytic graphitization of amorphous carbon, Carbon, 2004, pp. 2815-2820, vol. 42.
John D. Atkinson, et al., Synthesis and characterization of iron-impregnated porous carbon spheres prepared by ultrasonic spray pyrolysis, Carbon, 2011, pp. 587-598, vol. 49.
Yang Kai-Yu, et al., Synthesis and Characteristics of Fe3C Nanoparticles Embedded in Amorphous Carbon Matrix, Chemical Research in Chinese Universities, 2010, pp. 348-351, vol. 26(3).
Guczi and Kiricsi, Zeolite supported mono- and bimetallic systems: structure and; performance as CO hydrogenation catalysts, Applied Catalysis A: General. 1999, pp. 375-394, vol. 186.
Liu, Bo., et al., Metal-organic framework (MOF) as a template for syntheses of nanoporous carbons as electrode materials for supercapacitor, Carbon, 2010, pp. 456-463, vol. 48.
Lee, Hee Jung, et al., One-pot synthesis of magnetic particle-embedded porous carbon composites from metal-organic frameworks and their sorption properties, Chem. Commun, 2014, p. 5476, vol. 50.
Justin P. O'Byrne, et al., High CO2 and CO conversion to hydrocarbons using bridged Fe nanoparticles on carbon nanotubes, Catalysis Science & Technology, 2013, p. 1201-1207.
Reza M. Malek Abbaslou, et al., Iron catalysts supported on carbon nanotubes for Fishcer-Tropsch synthesis: Effect of catalytic site position, Applied Catalysis A: General, 367, 2009, p. 47-52.
Han-Kyol Youn, et al., MWCNT synthesis over Fe-BTC as a catalyst/carbon source via CVD, Materials Letters 65, 2011, p. 3055-3057.
Mulpuri Janardanarao, Direct Catalytic Conversion of Synthesis Gas to Lower Olefins, Ind. Eng. Chem. Res., 1990, 29, p. 1735-1753.
Jian-Ke Sun, et al., Functional materials derived from open framework templates/precursors: synthesis and applications, Energy & Environmental Science, 2014, p. 2071-2100.
PCT/ US2015/030739,; International Search Report, dated Aug. 26, 2015.
PCT/ US2015/030739, International Preliminary Report on Patentability, dated Dec. 1, 2016.
PCT/ US2015/030739,; Written Opinion of the International Searching Authority, dated Aug. 26, 2015.

* cited by examiner

PROCESS FOR SYNTHESIZING IRON CARBIDE FISCHER-TROPSCH CATALYSTS

The present application claims the benefit of U.S. Provisional Application No. 61/994,277, filed on May 16, 2014.

This invention relates generally to a method of preparing catalytic materials wherein iron carbide aliquots are disposed in and on a porous carbon matrix support material. This invention relates still more particularly to such a method wherein the porous carbon matrix is prepared via pyrolysis (also known as "thermal decomposition" or carbonization) of a metal organic framework (MOF) in the presence of an inert atmosphere such as that provided by nitrogen or a noble gas such as argon. This invention also relates to use of such catalytic materials in Fischer-Tropsch Synthesis ("FTS").

Depletion of petroleum reserves and rising environmental concerns are driving forces behind a movement to seek alternate processes for producing chemical feedstock materials. FTS, an example of an alternate process, is a polymerization reaction catalyzed by a transition metal catalyst wherein syngas (a mixture of carbon monoxide (CO) and hydrogen ($H_2$) derived from, for example, natural gas, coal, other crude sources, biomass or organic (municipal) waste), is converted into hydrocarbon containing products. Cobalt (Co), Ru (ruthenium), nickel (Ni) and iron (Fe) are all active in FTS, but only Co and Fe are applied industrially owing to their high selectivity and economic feasibility of the overall process. The choice of the catalyst is mainly dependant on the process conditions (namely high vs low temperature FTS, CO to $H_2$ ratio) and the desired product spectrum (light versus higher hydrocarbons, olefins, alcohols). For example, Co-based FTS catalysts, remain the preferred catalyst choice for the gas to liquids process (GTL). Fe-based catalysts are especially suited for the production of hydrocarbons from syngas derived from sources such as coal and biomass, which typically have a lower $H_2$ to CO ratio than stoichiometrically needed for the FTS reaction. Fe is widely available and thus Fe-based FTS catalysts are relatively cheap and, under high temperature FTS the product slate is more directed to short chain hydrocarbons and short-chain oxygenates, both among the most important building blocks of chemical industry.

In general, as prepared, Fe-based catalysts are composed of $Fe_2O_3$ crystallites (hematite) that are inactive in the FTS reaction. Consequently, prior to the FTS process, the as prepared catalysts need to be subjected to an activation process (reduction and/or carburization) to promote the development of the active phase. During the activation process and subsequent exposure to FTS conditions, iron oxides are transformed into carbidic iron species ($FeC_x$) that are believed to be the catalytically active phase.

A challenge in employing iron (Fe)-based catalysts for FTS lies in their poor stability under process conditions as evidenced by, for example, sintering, carbon deposition and dynamic iron phase changes. Under FTS conditions, bulk Fe catalysts display very low mechanical stability and tend to fragment due to formation of carbon deposits and density changes due to conversions between oxide and carbide phases. Catalyst fragmentation leads to the formation of fines (submicron particles) and in turn, to operational problems such as pressure drop and/or fouling in slurry reactors. One way to minimize nucleation of carbon deposits is to reduce the size of $Fe_2O_3$ crystallite precursors. In an effort to increase Fe dispersion, some practriners resort to using structural promoters such as silica ($SiO_2$), zinc oxide (ZnO), titania ($TiO_2$) and gamma-alumina ($\gamma$-$Al_2O_3$). A drawback of such structural promoters is their rendency to form mixed oxides (i.e., iron silicates, titanates) that are hardly active in FTS.

Other practitioners propose using a carbon support in a form such as activated carbon, carbon nano-fibers (CNF), carbon nano-tubes (CNT), carbon spheres or glassy carbon in preparing Fe-based FTS catalysts. Metal-impregnated carbon materials typically require preparation via a multi-step process that includes 1) carbonization of an organic precursor, 2) physical or chemical activation of the carbonized precursor, 3) impregnation of the carbonized precursor with metal species via known techniques such as incipient wetness impregnation, ion exchange or chemical vapor deposition, and 4) reduction of metal species to their metallic state, preferably in the form of nanoparticles. The multi-step process is usually non-continuous and leads to some compromise in active phase distribution during step 4), especially as one seeks to increase in iron loading for a more active catalyst material. In an alternate process, where one directly carbonizes Fe dispersed in a polymer, nanoparticles formation tends to yield a broader than desired iron particle size distribution.

Recent material developments include using metal organic frameworks (MOFs) as candidate precursors for synthesizing various nano-scale materials. In one example, Liu et al., in "Metal-organic-framework (MOF) as a template for synthesis of nanoporous carbons for supercapacitor", Carbon 48 (2010), pages 456-463 teaches use of MOF-5 as a template and furfuryl alcohol (FA) as an additional carbon source to synthesize porous carbon for use as an electrode material for supercapacitors. See also Liu et al., in "Metal-Organic-Framework as a Template for Porous Carbon Synthesis", Journal of the American Chemical Society 130 (2008), pages 5390-5391.

USPAP 2012/0049110 (Truckhan et al.) discusses a process for producing a carbon-comprising compound, wherein a porous MOF that comprises at least one nitrogen-free bidentate organic compound coordinated to at least one metal ion is pyrolyzed under a protective gas atmosphere. Pyrolysis occurs at a temperature of at least 500° C., preferably within a range of from 600° C. to 1000° C. and more preferably from 600° C. to 800° C. The metal may be any metal selected from Groups IA, IIA, IIIA, IVA to VIIa and IB to VIB of the Periodic Table of the Elements.

Patent Cooperation Treaty Publication (WO) 2013/076742 A1 (Banerjee et al.) provides teachings relative to magnetically recoverable high surface area carbon-ferric oxide ($Fe_3O_4$) nanocomposites prepared by thermal decomposition of a MOF that is composed of iron-benzene dicarboxylic acid (BDC). The nanocomposites have a rod-like morphology, wherein 50 nm $Fe_3O_4$ particles are embedded into a carbon matrix.

USPAP 2012/0259026 (Tones Galvis et al.) discloses a FTS process using a catalyst that comprises an alpha-alumina ($\alpha$-$Al_2O_3$) support and a catalytically active component that comprises Fe-containing particles dispersed onto the support. The catalysts have an active phase that is ultimately iron or iron carbide formed in situ. The process includes thermal decomposition of a precursor material such as an organic Fe complex (e.g. Fe oleate or a Fe salt of an organic acid (e.g. Fe citrate)) disposed on an $\alpha$-$Al_2O_3$ support.

Canadian Patent Application (CA) 2 826 510 (Proietti et al.) relates generally to catalysts made using thermally decomposable porous supports (e.g. a MOF that includes a zeolitic imidazolate frame work such as ZIF-8 that includes zinc (Zn), Co, manganese (Mn), magnesium (Mg), Fe, copper (Cu), aluminum (Al) or chromium (Cr)) and more particularly to catalyst precursors that have a thermally decomposable porous support, an organic coating/filling compound (e.g. a compound with a poly-aromatic structure such as perylene-tetracarboxylic-dianhydride) and a non-precious metal precursor (e.g. a salt of a non-precious metal or an organometallic complex of a non-precious metal wherein the non-precious metal precursor is iron (II) acetate (Fe(II) acetate)), wherein the organic coating/filling compound and the non-precious metal catalyst precursor coat and/or fill the pores of the thermally decomposable porous support.

Fedoseeva et al., in "Effect of oxidation and heat treatment on the morphology and electronic structure of carbon-encapsulated iron carbide nanoparticles", *Materials Chemistry and Physics* 135 (2012), pages 235-240, provides teachings relative to production of the title materials via co-carbonization of a mixture of an aromatic heavy oil and ferrocene at 450° C. under autogenous pressure. Such materials have a variety of utilities including use in FTS.

Lee et al., in "One-pot synthesis of magnetic particle-embedded porous carbon composites from metal-organic frameworks and their sorption properties", *Chem. Commun*, 2014, 50 5476, discusses preparation of nano- and micro-composites of porous carbon and magnetic particles by one-step pyrolysis of MOFs (e.g. iron-containing MOFs such as Fe-MIL-88A or Fe-MIL-88B) and suggests that one may alter porosity and composition of resulting magnetic porous carbons by changing the pyrolysis and the organic building blocks incorporated within the initial MOFs. Iron contained in the pyrolyzed MOFs is present as $\gamma$-$Fe_2O_3$, $Fe_3C$ or $\alpha$-Fe.

Sajitha et al., in "Synthesis and characteristics of iron nanoparticles in a carbon matrix along with the catalytic graphitization of amorphous carbon", *Carbon* 42 (2004), pages 2815-2820, discloses synthesis of iron nano-particles in a carbon matrix by in-situ pyrolysis of maleic anhydride and ferrocene, using different molecular weight percentages.

A desire exists for stable iron-based FTS catalysts that have a high iron loading of up to 50 percent by weight (wt %), based upon total catalyst weight, concurrent with dispersion of active species (e.g. iron carbide) in discrete aliquots that are embedded in a porous matrix of carbon.

In some aspects, this invention is a process for preparing a Fischer-Tropsch Synthesis catalyst comprising two steps that may be performed in either order as follows: a) impregnating an iron carboxylate metal organic framework (including but not limited to iron-1,3,5-benzenetricarboxylate [including MIL-100(Fe), and/or (Fe-BTC), Basolite™ F-300,], iron-1,4 benzenedicarboxylate [including MIL-101(Fe), MIL-53 (Fe) or MIL-68 (Fe)], iron fumarate [including MIL-88 A (Fe)], iron azobenzenetetracarboxylate [MIL-127 (Fe)], iron amino 1,4 benzendicarboxylate [including $NH_2$-MIL-101 (Fe), $NH_2$-MIL-53 (Fe) or $NH_2$-MIL-68 (Fe)]), with a solution of a promoter element including alkali metals and alkaline earth metals as well as other known Fisher Tropsch catalyst promoters such as sulfur, manganese, copper; and b) thermally decomposing the iron carboxylate metal organic framework at a temperature within a range of from 400° C. to 1000° C., under an inert gaseous atmosphere to yield a catalyst that is a porous carbon matrix having embedded therein a plurality of discrete aliquots of iron carbide, the discrete aliquots having a mean particle size that ranges from greater than zero nanometer to less than 100 nanometer (nm), preferably less than 60 nm, more preferably less than 50 nm, and still more preferably with a range of from 2.5 nm to 50 nm, even more preferably from 2.5 nm to 30 nm, and being present in a total amount within a range of from 10 or 20 weight percent (wt %) to no more than 60 wt %, preferably from 25 wt % to 50 wt %, more preferably from 25 wt % to 40 wt %, in each case based upon total catalyst weight.

The thermal decomposition temperature preferably ranges from 400° C. to 1000° C., more preferably from 500° C. to 900° C.

The inert gaseous atmosphere preferably includes at least one of nitrogen or a noble gas (helium, neon, argon, krypton, xenon, and radon) with at least one of nitrogen, helium, and argon being more preferred.

The amount of iron carbide after pyrolysis preferably ranges from 13 wt % to 54 wt %, more preferably from 22 wt % to 54 wt %, in each case based on total catalyst weight.

In one variation of such aspects, the MOF materials can be pyrolized or thermally decomposed 'as synthesized', i.e. without removal of solvent molecules, templates, and/or linker molecules. The removal of guest molecules (solvent or other chemicals used during synthesis) from the MOF without compromising its structural integrity and hence porosity is typical referred to MOF activation. However, for this invention, it was discovered that the MOF precursors do not require the activation step.

In one variation of such aspects, impregnation of the iron carboxylate metal organic framework with the solution of a promoter metal occurs before thermal decomposition such that both the iron carboxylate metal organic framework and the promoter metal solution undergo thermal decomposition. In another variation of such aspects, impregnation with the solution of a promoter element occurs after thermal decomposition of the iron carboxylate metal organic framework.

In some related aspects, the promoter element is an alkali metal that is present in an amount that yields an alkali metal/iron atomic ratio within a range of from greater than zero to less than or equal to 0.2, preferably to less than or equal to 0.05, more preferably to less than or equal to 0.02. Alkali metals useful in this invention are found in Group IA of the Periodic Table of the Elements and include lithium, sodium, potassium, rubidium and cesium, with potassium and sodium being preferred. Alkaline earth metals useful in this invention are found in Group HA of the Periodic Table of the Elements and include beryllium, magnesium, calcium, barium, and strontium, with barium and calcium being preferred. One may use at least one of each of an alkali metal and an alkaline earth metal or two or more alkali metals or two or more alkaline earth metals in making the promoted iron carbide catalysts of this invention.

In some other aspects, the foregoing process further comprises a step that precedes step b) wherein the iron carboxylate metal organic framework is impregnated with an organic solvent and/or aqueous solution of an additional carbon source and the additional carbon source is polymerized under an inert gaseous atmosphere at a temperature within a range of from 50° C. to 200° C., preferably from 50° C. to 150° C., more preferably from 80° C. to 150° C. for a period of time at least of one hour, preferably at least 14 hours, more preferably less than or equal to 24 hours to yield a polymer-modified iron carboxylate metal organic framework.

In some related aspects, the organic solvent is an oxygenated solvent, for example, at least one solvent selected from a group consisting of alcohols, ethers, esters, ketones and aldehydes, preferably an alcohol, and more preferably methanol, ethanol, propanol or butanol, and mixtures thereof, and the polymerizable additional carbon source is furfuryl alcohol, the furfuryl alcohol being present in an amount within a range of from greater than zero volume percent (vol %) to less than or equal to 100 vol %, preferably from greater than zero vol % to 50 vol %, each volume percent being based upon total alcohol solution volume. Other suitable polymerizable additional carbon sources include, without limit pyrrole, polyols, and carbohydrates.

Iron-containing MOFs used in the process of this invention are preferably selected from a group consisting of iron-1,3,5-benzenetricarboxylate (Fe-BTC, basolite F-300), iron-1,4 benzenedicarboxylate (MIL-101 (Fe), MIL-53 (Fe) or MIL-68 (Fe)), iron fumarate (MIL-88 A (Fe)) and iron azobenzenetetracarboxylate (MIL-127 (Fe)) Other iron-containing MOFs that may be useful include, without limit, linkers consisting of porphyrins derivatives, perylene derivatives, carboxylates, including nitrogen-containing carboxylates, such as pyridine-like moieties with one nitrogen atom (pyridines), two nitrogen atoms (imidazoles, bipyridines), or more nitrogen atoms, such as three nitrogen atoms (triazoles). Nitrogen-containing carboxylates may be used in combination with dicarboxylates or tricarboxylates. Suitable carboxylates include those selected from the group consisting of oxalic acid, malonic acid, succinic acid, glutaric acid, phthalic acid, isophthalic acid, terephthalic acid, citric acid, trimesic acid.

Iron carbide catalysts resulting from this process are very suitable to be used directly in an FTS process without activation. In typical FTS processes, Fe-based catalysts are usually activated or pre-treated before the materials become active in the FTS reaction.

Such pre-treatments typically include a reduction step (i.e. exposure to a reducing atmosphere like $H_2$, CO or a mixture thereof) to create an at least partially reduced iron phase, and subsequently carburized in the presence of CO or syngas prior to or during the use in the FTS reaction. This activation step then results in the formation of the active Fe-carbide phase that will be able to perform the FTS reaction. A specific embodiment of the current invention, however, is that the process directly results in the formation of an Fe-carbide active phase and consequently the pre-treatment of the materials before starting the FTS process conditions is not required.

Iron carbide catalytic materials prepared in accord with the present invention have a variety of potential utilities in addition to utility as a FTS catalyst. The potential utililties include, without limit, hydrogenolysis (such as hydrodeoxygenation, hydrodesulfurization, hydrodechlorination), syngas to alcohols, oxygen reduction, water-gas shift reaction, dry reforming, hydrotreating/selective hydrogenation, denox, $NH_3$ decomposition, $H_2O$ splitting, $H_2$ fuel cell applications, $H_2$ evolution, alkylation, alcohol dehydration, methanol oxidation, and dehydroaromatization.

The process of the present invention may be used to make metal carbides other than iron carbide which have the same subject the carbonized precursors to incipient wetness impregnation with a solution of potassium carbonate ($K_2CO_3$) in an aqueous methanol solution (50/50 volume of water and methanol) in an amount sufficient to provide respective potassium (K) loadings of 0.1 wt % for Catalyst 1, 0.3 wt % for Catalyst 2 and 0.6 wt % for Catalyst 3.

Electron microscopy analysis shows that Catalysts 1-3 are present as well-dispersed spherical Fe nano-particles (mean particle size of 3.6 nm) embedded in a carbon matrix. In situ Mossbauer spectroscopy enables identification and quantification of type of iron phase types formed during the synthesis. After pyrolysis 26% of the iron species are in the form of $FeC_x$ phase. Following syngas exposure, 89% of the iron species are present as active Hägg carbide ($\chi$-$Fe_5C_2$) for FTS. Furthermore, Catalysts 1-3 all have a Fe content of 38 wt %.

Premix 10 milligrams (mg) (approximately 20 microliters (μL)) of each catalyst sized to 80-100 mesh (177 μm to 150 micrometers (μm)) with 100 μL of silicon carbide (SiC) to yield premixed samples and load the premixed samples into a tubular micro-reactor (internal diameter 4 mm, length 16 millimeters). Before exposing the premixed samples to syngas, activate the samples under hydrogen atmosphere (3 bar ($3\times10^5$ pascals (Pa))/425° C./3 h). Allow reactor temperature to decrease to 340° C., then change atmosphere within the reactor to a mixture of hydrogen and carbon monoxide (CO 45 vol. %, $H_2$ 45 vol. % and He 10 vol. %, all vol % being based upon combined volume of CO, $H_2$ and He) and raise reactor pressure to 20 bar ($2\times10^6$ Pa). Conduct catalytic testing at a syngas flow rate of 10 cubic centimeters per minute at standard temperature and pressure ($cm^3$/min (STP)) over a period of 100 hours (h. Table 1 below summarizes catalyst test results. The catalytic activity is expressed as conversion of CO and iron time yield (FTY), the latter corresponding to moles of CO converted to hydrocarbons per gram of iron and per second.

TABLE 1

Catalytic performance for Catalysts 1-3 after 4 and 100 h TOS: Conversion of CO (X, %), iron time yield (FTY, mol $g_{Fe}^{-1}$ $s^{-1}$) selectivity of methane (expressed as Cmol. %), fraction of Olefins for $C_2$ and $C_3$ hydrocarbons.

| | Performance after 4 h TOS[a] | | | | Performance after 100 h TOS[a] | | | | |
|---|---|---|---|---|---|---|---|---|---|
| | | | | | | FTY | | | |
| Catalyst | X % | $CH_4$ % | C2 ratio O/(O + P) | C3 ratio O/(O + P) | X % | $10^{-4}$ mol $g_{Fe}^{-1}$ $s^{-1}$ | $CH_4$ % | C2 ratio O/(O + P) | C3 ratio O/(O + P) |
| 1 | 84 | 11.2 | 0.15 | 0.84 | 80 | 3.74 | 12.4 | 0.13 | 0.79 |
| 2 | 89 | 10.5 | 0.18 | 0.89 | 87 | 4.07 | 11.4 | 0.17 | 0.87 |
| 3 | 94 | 6.0 | 0.64 | 0.94 | 93 | 4.35 | 6.3 | 0.59 | 0.92 |

[a]FTS conditions: 340° C., 20 bar, CO:$H_2$ = 1 and 30,000 $h^{-1}$.

or similar utilities as iron carbide albeit potentially to a different degree of effectiveness. The metal component of such other metal carbides includes at least one metal selected from a group consisting of molybdenum, tungsten, zirconium, hafnium, cobalt, titanium, chromium, tantalum, nickel, vanadium, thallium, silver, ruthenium, and niobium with combinations such as nickel/molybdenum, silver/tungsten, nickel/tungsten and cobalt/molybdenum being among combinations of two such metals.

EXAMPLE (EX) 1 (K PROMOTED)

For each of Catalysts 1-3, Fe-BTC (iron-1,3,5-benzenetricarboxylate, $C_9H_3FeO_6$, commercially available from Sigma-Aldrich under the trade designation Basolite™ F-300) is used as a Fe-MOF precursor. Pyrolyze the precursor at 500° C. for eight (8) hours. Following pyrolysis The data in Table 1 show that the incorporation of K at the designated loadings effectively tunes product distribution towards olefins, while minimizing methane content and increasing the conversion level. In all cases, the catalysts 1-3 show stable performance during 100 h TOS.

EX 2 (K PROMOTED, WITHOUT ACTIVATION)

Replicate Ex 1 (Catalyst 3) but without activation of the catalyst prior to the FTS reaction. Premix 10 mg of catalyst 3 sized to 80-100 mesh with 100 μL of SiC to yield premixed samples and load the premixed samples into a tubular micro-reactor (internal diameter 4 mm, length 16 millimeters). Increase the reactor temperature to 340° C. under helium, then change atmosphere within the reactor to a mixture of hydrogen and carbon monoxide (CO 45 vol. %, $H_2$ 45 vol. % and He 10 vol. %, all vol % being based upon combined volume of CO, $H_2$ and He) and raise reactor pressure to 20 bar ($2\times10^6$ Pa). Conduct catalytic testing at a syngas flow rate of 10 cubic centimeters per minute at standard temperature and pressure ($cm^3$/min (STP)) over a period of 100 hours (h). Table 2 below summarizes catalyst test results for catalyst 3 with and without activation step prior to FTS reaction.

TABLE 2

Catalytic performance for Catalyst 3 after 90 h TOS (with and without activation prior to the FTS reaction): Conversion of CO (X, %), iron time yield (FTY, mol $g_{Fe}^{-1}$ $s^{-1}$), selectivity of methane and $C_2$ and $C_3$ olefins (expressed as Cmol. %) and fraction of Olefins for $C_2$ and $C_3$ hydrocarbons.

| | | Performance after 90 h TOS[a] | | | | | |
|---|---|---|---|---|---|---|---|
| Catalyst | Activation | X % | FTY $10^{-4}$ mol $g_{Fe}^{-1}$ $s^{-1}$ | $CH_4$ % | C2 = % | C2 ratio O/(O + P) | C3 = % | C3 ratio O/(O + P) |
| 3 | Yes | 93 | 4.35 | 6.3 | 3.5 | 0.59 | 7.3 | 0.92 |
| 3 | No | 92 | 4.30 | 6.6 | 3.2 | 0.62 | 7.0 | 0.90 |

[a]FTS conditions: 340° C., 20 bar, $CO:H_2$ = 1 and 30,000 $h^{-1}$.

The data in Table 2 show that the catalysts prepared from this approach do not require an activation step prior to the FTS reaction.

EX 3 (NA PROMOTED)

For each of Catalysts 4-5, use Basolite™ F-300 as a Fe-MOF precursor. Subject Basolite™ F-300 to incipient wetness impregnation (incipient wetness volume~1.2 ml/g) with an aqueous solution of sodium nitrate ($NaNO_3$) in an amount sufficient to provide respective sodium (Na) loadings of 0.05 wt % for Catalyst 4 and 0.1 wt % for Catalyst 5. Pyrolyze the resultant material at 500° C. for 8 hours under nitrogen atmosphere, using a heating rate of 2° C. $min^{-1}$ to yield a promoted catalyst.

Catalysts 4 and 5 have a Fe content of 41 and 44 wt %, respectively.

Premix 10 mg of each catalyst sized to 80-100 mesh with 100 μL of SiC to yield premixed samples and load the premixed samples into a tubular micro-reactor (internal diameter 4 mm, length 16 millimeters). Increase the reactor temperature to 340° C. under helium, then change atmosphere within the reactor to a mixture of hydrogen and carbon monoxide (CO 45 vol. %, $H_2$ 45 vol. % and He 10 vol. %, all vol % being based upon combined volume of CO, $H_2$ and He) and raise reactor pressure to 20 bar ($2\times10^6$ Pa). Conduct catalytic testing at a syngas flow rate of 10 cubic centimeters per minute at standard temperature and pressure ($cm^3$/min (STP)) over a period of 100 hours (h). Table 3 below summarizes catalyst test results.

TABLE 3

Catalytic performance for Catalysts 4-5 after 90 h TOS: Conversion of CO (X, %), iron time yield (FTY, mol $g_{Fe}^{-1}$ $s^{-1}$), selectivity of methane and C2 and C3 olefins (expressed as Cmol. %) and fraction of Olefins for $C_2$ and $C_3$ hydrocarbons.

| | FTS performance after 90 h TOS[a] | | | | | |
|---|---|---|---|---|---|---|
| Catalyst | X % | FTY $10^{-4}$ mol $g_{Fe}^{-1}$ $s^{-1}$ | $CH_4$ % | C2 = % | $C_2$ ratio O/(O + P) | C3 = % | $C_3$ ratio O/(O + P) |
| 4 | 87 | 3.8 | 4.5 | 3.6 | 0.70 | 6.0 | 0.92 |
| 5 | 89 | 3.2 | 3.5 | 3.9 | 0.74 | 5.1 | 0.92 |

[a]FTS conditions: 340° C., 20 bar, $CO:H_2$ = 1 and 30, 000 $h^{-1}$.

The Data in Table 3 demonstrate that sodium efficiently tunes the product distribution towards olefins while minimizing the methane formation.

EX 4 (NA—LI PROMOTED)

Replicate Ex. 3 with changes to prepare Catalysts 6. Subject Basolite™ F-300 to incipient wetness impregnation (incipient wetness volume~1.2 ml/g) with an aqueous solution containing sodium nitrate ($NaNO_3$) and lithium nitrate ($LiNO_3$) in an amount sufficient to provide respective sodium (Na) and lithium (Li) loadings of 0.05 and 0.01 wt %, respectively for Catalyst 6. Pyrolyze the resultant material at 500° C. for 8 hours under nitrogen atmosphere, using a heating rate of 2° C. $min^{-1}$ to yield a promoted catalyst. Table 4 below summarizes catalyst test results.

Catalyst 6 has a Fe content of 42 wt %.

TABLE 4

Catalytic performance for Catalyst 6 after 90 h TOS: Conversion of CO (X, %), iron time yield (FTY, mol $g_{Fe}^{-1}$ $s^{-1}$), selectivity of methane and C2-C3 olefins (expressed as Cmol. %) and fraction of Olefins for $C_2$ and $C_3$ hydrocarbons.

| | FTS performance after 90 h TOS[a] | | | | | |
|---|---|---|---|---|---|---|
| Catalyst | X % | FTY $10^{-4}$ mol $g_{Fe}^{-1}$ $s^{-1}$ | $CH_4$ % | C2 = % | $C_2$ ratio O/(O + P) | C3 = % | $C_3$ ratio O/(O + P) |
| 6 | 82 | 3.57 | 3.0 | 3.9 | 0.80 | 6.1 | 0.93 |

[a]FTS conditions: 340° C., 20 bar, $CO:H_2$ = 1 and 30,000 $h^{-1}$.

The data in Table 4 show that a combination of different types of alkali metals also results in minimizing the methane selectivity and maximizing the olefins selectivity.

EX 5 (CS PROMOTED)

Replicate Ex. 3 with changes to prepare Catalyst 7. Subject Basolite™ F-300 to incipient wetness impregnation (incipient wetness volume~1.2 ml/g) with an aqueous solution of cesium carbonate ($Cs_2CO_3$) in an amount sufficient to provide respective cesium (Cs) loadings of 1.2 wt % for Catalyst 7. Pyrolyze the resultant material at 500° C. for 8 hours under nitrogen atmosphere, using a heating rate of 2° C. $min^{-1}$ to yield a promoted catalyst. Table 5 below summarizes catalyst test results. Catalysts 7 have a Fe content of 42 wt %.

TABLE 5

Catalytic performance for Catalyst 7 after 90 h TOS: Conversion of CO (X, %), iron time yield (FTY, mol $g_{Fe}^{-1}$ $s^{-1}$), selectivity of methane ($CH_4$) and C2-C3 olefins (expressed as Cmol. %) and fraction of Olefins for $C_2$ and $C_3$ hydrocarbons.

| | FTS performance after 90 h TOS[a] | | | | | |
|---|---|---|---|---|---|---|
| Catalyst | X % | FTY $10^{-4}$ mol $g_{Fe}^{-1}$ $s^{-1}$ | $CH_4$ % | C2 = % | $C_2$ ratio O/(O + P) | C3 = % | $C_3$ ratio O/(O + P) |
| 7 | 94 | 3.98 | 8.9 | 1.91 | 0.31 | 7.6 | 0.81 |

[a]FTS conditions: 340° C., 20 bar, $CO:H_2$ = 1 and 30,000 $h^{-1}$.

The presence of cesium also shifts the product distribution towards olefins and minimizes the methane selectivity. Data in Table 5 demonstrate that the efficiency of promotion may depend on the type of alkali promoter.

EX 6 (NON-PROMOTED; EFFECT OF PYROLYSIS CONDITIONS)

For each of Catalysts 8-11, use Basolite™ F-300 as a Fe-MOF precursor. Pyrolyse Basolite™ F-300 at 400° C. for Catalyst 8, 500° C. for Catalyst 9, 600° C. for Catalyst 10 and 900° C. for Catalyst 11 for eight (8) hours at a rate of two (2) ° C. per minute.

In situ Mossbauer spectroscopy (Table 6) during pyrolysis at different temperatures demonstrates that the type of iron carbides formed on the catalyst strongly depends on the pyrolysis temperature. Lower pyrolysis temperatures favor the formation of $\epsilon'$-$Fe_{22}C$, while higher temperatures (500-600° C.) favor the formation of $\chi$-$Fe_5C_2$ (III). XRD and EXAFS analysis of catalysts synthesized at higher temperatures (900° C.) indicate the presence of cementite ($\theta$-$Fe_3C$) as main carbide phase.

Additional characterization data by TEM and TGA shows that the Fe loading and particle size increases with the pyrolysis temperature (Table 7). For example, the particle size increases from 3.6 to 6.0 nm, when the pyrolysis temperature increases from 500 to 600° C.

TABLE 6

Effect of pyrolysis temperature on iron composition after syngas exposure

| Temperature of pyrolysis | Treatment | Composition | % |
|---|---|---|---|
| 450 | $H_2/CO$ = 1 340° C., 5 h | $\epsilon'$-$Fe_{2.2}C$ | 27 |
| | | $\chi$-$Fe_5C_2$ (I) | 33 |
| | | $\chi$-$Fe_5C_2$ (II) | 21 |
| | | $\chi$-$Fe_5C_2$ (III) | 13 |
| | | $Fe^{3+}$ | 6 |
| 500 | $H_2/CO$ = 1 340° C., 5 h | $\chi$-$Fe_5C_2$ (I) | 39 |
| | | $\chi$-$Fe_5C_2$ (II) | 26 |
| | | $\chi$-$Fe_5C_2$ (III) | 21 |
| | | $Fe^{3+}$ (SPM) | 9 |
| | | $Fe_xC$) | |
| | | $Fe^{2+}$ | 5 |
| 600 | $H_2/CO$ = 1 340° C., 5 h | $\epsilon'$-$Fe_{2.2}C$ | 53 |
| | | $Fe^{3+}$ (FexC) | 7 |
| | | $Fe^{3+}$ (FeI—xO I) | 5 |
| | | $Fe^{2+}$ (FeI—xO II) | 35 |

Premix 10 mg of each catalyst sized to 80-100 mesh with 100 µL of SiC to yield premixed samples and load the premixed samples into a tubular micro-reactor (internal diameter 4 mm, length 16 millimeters). Before exposing the premixed samples to syngas, activate the samples under hydrogen atmosphere (3 bar (3×10⁵ pascals (Pa))/425° C./3 h). Allow reactor temperature to decrease to 340° C., then change atmosphere within the reactor to a mixture of hydrogen and carbon monoxide (CO 45 vol. %, $H_2$ 45 vol. % and He 10 vol. %, all vol % being based upon combined volume of CO, $H_2$ and He) and raise reactor pressure to 20 bar ($2\times10^6$ Pa). Conduct catalytic testing at a syngas flow rate of 10 cubic centimeters per minute at standard temperature and pressure ($cm^3$/min (STP)) over a period of 100 hours (h). Table 7 below summarizes catalyst test results.

TABLE 7

Average particle size, Fe loading and catalytic performance for Catalysts 8-11 after 90 h TOS: Conversion of CO (X, %), iron time yield (FTY, mol $g_{Fe}^{-1}$ $s^{-1}$), selectivity of methane ($CH_4$) and C2-C3 olefins (expressed as Cmol. %) and fraction of Olefins for $C_2$ and $C_3$ hydrocarbons.

| | | | | FTS performance after 90 h TOS[a] | | | | |
|---|---|---|---|---|---|---|---|---|
| Catalyst | d Fe, nm | Fe wt % | X % | FTY $10^{-4}$ mol $g_{Fe}^{-1}$ $s^{-1}$ | $CH_4$ % | C2= % | $C_2$ ratio O/(O + P) | C3 = % | $C_3$ ratio O/(O + P) |
| 8 | >3.6 | 35 | 74 | 3.75 | 17.0 | 1.5 | 0.17 | 7.5 | 0.69 |
| 9 | 3.6 | 38 | 76 | 3.63 | 15.5 | 1.1 | 0.13 | 7.0 | 0.64 |
| 10 | 6.0 | 43 | 74 | 3.09 | 14.0 | 1.1 | 0.13 | 7.4 | 0.54 |
| 11 | ~10-50 | 53 | 65 | 1.84 | 13.0 | 1.8 | 0.21 | 6.9 | 0.70 |

[a]FTS conditions: 340° C., 20 bar, $CO:H_2$ = 1 and 30,000 $h^{-1}$.

The data in Table 7 show that the pyrolysis temperature is a parameter to control activity of the resultant catalyst and the FTS product distribution.

EX 7 (K PROMOTED, EFFECT OF PYROLYSIS CONDITIONS)

Replicate Ex 4 with changes to prepare Catalysts 12-15. Following pyrolysis (carbonization) at 400, 500, 600 and 900° C. for 8 hours, subject the carbonized precursors to incipient wetness impregnation with a solution of potassium carbonate ($K_2CO_3$) in an aqueous methanol solution (50/50 volume of water and methanol) in an amount sufficient to provide respective potassium (K) loadings of 0.5 wt % to give Catalysts 12, 13, 14 and 15, respectively. Heat the resultant material up to 80° C. for 2 h under inert atmosphere (heating rate of 2° C. $min^{-1}$) to yield a promoted catalyst. A summary of catalyst performance test results is given in Table 8.

TABLE 8

Average particle size, Fe loading and catalytic performance for Catalysts 12-15 after 90 h TOS: Conversion of CO (X, %), iron time yield (FTY, mol $g_{Fe}^{-1}$ $s^{-1}$), selectivity of methane ($CH_4$) and C2-C3 olefins (expressed as Cmol. %) and fraction of Olefins for $C_2$ and $C_3$ hydrocarbons.

| | | | | FTS performance after 90 h TOS[a] | | | | |
|---|---|---|---|---|---|---|---|---|
| Catalyst | d Fe nm | Fe wt % | X % | FTY $10^{-4}$ mol $g_{Fe}^{-1}$ $s^{-1}$ | $CH_4$ % | C2= % | $C_2$ ratio O/ (O + P) | C3 = % | $C_3$ ratio O/ (O + P) |
| 12 | >3.6 | 35 | 6 | 0.31 | 3.1 | 5 | 0.83 | 6.7 | 0.92 |
| 13 | 3.6 | 38 | 92 | 4.35 | 7.8 | 3.3 | 0.49 | 8 | 0.89 |
| 14 | 6.0 | 43 | 92 | 4.01 | 6.8 | 3.4 | 0.57 | 7.3 | 0.88 |
| 15 | ~10-50 | 53 | 10 | 0.37 | 4.3 | 8.7 | 0.87 | 8.1 | 0.92 |

[a]FTS conditions: 340° C., 20 bar, $CO:H_2$ = 1 and 30,000 $h^{-1}$.

Comparing the data in Table 8 with Table 7 demonstrates that K effectively tunes the activity and the FTS product distribution. In all cases, K minimizes the methane selectivity and shifts the distribution to lower olefins. In terms of activity, K introduction decreases significantly the activity of catalysts 12 and 15, and has an opposite effect for catalysts 13 and 14. This effect demonstrate that the optimum level of K is dependant upon the particle size and type of carbide phase present.

EX 8 (K PROMOTED, VARIED MOF PRECURSORS)

For each of Catalysts 16-18, use MIL-88A (Fe), MIL-127 (Fe) and MIL-68 (Fe) as a Fe-MOF precursor, respectively. Pyrolyze the Fe MOF precursors at 500° C. for eight (8) hours at a rate of two (2) ° C. per minute. Following pyrolysis subject the carbonized precursors to incipient wetness impregnation with a solution of potassium carbonate ($K_2CO_3$) in an aqueous methanol solution (50/50 volume of water and methanol) in an amount sufficient to provide respective potassium (K) loadings of 0.5 wt %, to give catalyst 16-18. Heat the resultant material up to 80° C. for 2 h under inert atmosphere (heating rate of 2° C. $min^{-1}$) to yield a promoted catalyst.

Premix 10 milligrams mg of each catalyst sized to 80-100 mesh with 100 μL of SiC to yield premixed samples and load the premixed samples into a tubular micro-reactor (internal diameter 4 mm, length 16 millimeters). Before exposing the premixed samples to syngas, activate the samples under hydrogen atmosphere (3 bar ($3\times10^5$ pascals (Pa))/425° C./3 h). Allow reactor temperature to decrease to 340° C., then change atmosphere within the reactor to a mixture of hydrogen and carbon monoxide (CO 45 vol. %, $H_2$ 45 vol. % and He 10 vol. %, all vol % being based upon combined volume of CO, $H_2$ and He) and raise reactor pressure to 20 bar ($2\times10^6$ Pa). Conduct catalytic testing at a syngas flow rate of 10 cubic centimeters per minute at standard temperature and pressure ($cm^3$/min (STP)) over a period of 100 hours (h). Catalyst performance test results are summarized in Table 9.

TABLE 9

Fe loading and catalytic performance for Catalysts 16-18 after 90 h TOS: Conversion of CO (X, %), iron time yield (FTY, mol $g_{Fe}^{-1}$ $s^{-1}$), selectivity of methane ($CH_4$) and C2-C3 olefins (expressed as Cmol. %) and fraction of Olefins for $C_2$ and $C_3$ hydrocarbons.

| | | | FTS performance after 90 h TOS[a] | | | | | |
|---|---|---|---|---|---|---|---|---|
| Catalyst | Fe wt % | X % | FTY $10^{-4}$ mol $g_{Fe}^{-1}$ $s^{-1}$ | $CH_4$ % | $C_2$ = % | $C_2$ ratio O/(O + P) | $C_3$ = % | $C_3$ ratio O/(O + P) |
| 16 | 58 | 71 | 2.10 | 12 | 4.4 | 0.28 | 6.2 | 0.87 |
| 17 | 41 | 92 | 3.85 | 14 | 1.3 | 0.21 | 6.7 | 0.75 |
| 18 | 51 | 41 | 1.21 | 9.6 | 3.0 | 0.51 | 6.4 | 0.77 |

[a]FTS conditions: 340° C., 20 bar, CO:$H_2$ = 1 and 30,000 $h^{-1}$.

The data in Table 9 show that the type of MOF precursor plays a strong role on the resultant FTS activity and product distribution. Furthermore, the addition of a promoter also results in improved selectivity, for catalysts that are made from alternative precursors.

EX 9 (NA PROMOTED; MIL-100 (FE))

For Catalyst 19 use MIL-100 (Fe) as Fe-MOF precursor. Subject MIL-100 (Fe) to incipient wetness impregnation (incipient wetness volume~1.2 ml/g) with an aqueous solution of sodium nitrate ($NaNO_3$) in an amount sufficient to provide respective sodium loadings of 0.05 wt % for catalyst 19. Pyrolyze the resultant material at 500° C. for 8 hours under nitrogen atmosphere, using a heating rate of 2° C. $min^{-1}$ to yield a promoted catalyst.

Catalyst 19 has a Fe content of 29 wt %.

Premix 10 mg of each catalyst sized to 80-100 mesh with 100 μL of SiC to yield premixed samples and load the premixed samples into a tubular micro-reactor (internal diameter 4 mm, length 16 millimeters). Increase the reactor temperature to 340° C. under helium, then change atmosphere within the reactor to a mixture of hydrogen and carbon monoxide (CO 45 vol. %, $H_2$ 45 vol. % and He 10 vol. %, all vol % being based upon combined volume of CO, $H_2$ and He) and raise reactor pressure to 20 bar ($2 \times 10^6$ Pa). Conduct catalytic testing at a syngas flow rate of 10 cubic centimeters per minute at standard temperature and pressure ($cm^3$/min (STP)) over a period of 100 hours (h). Table 10 below summarizes catalyst test results, together with Catalyst 4 as a reference.

TABLE 10

Fe loading and catalytic performance for Catalysts 4 and 19 after 90 h TOS: Conversion of CO (X, %), selectivity of methane ($CH_4$) and C2-C3 olefins (S, expressed as Cmol. %) and fraction of Olefins for $C_2$ and $C_3$ hydrocarbons.

| | | | FTS performance after 90 h TOS[a] | | | | | |
|---|---|---|---|---|---|---|---|---|
| Catalyst | Fe wt % | X % | FTY $10^{-4}$ mol $g_{Fe}^{-1}$ $s^{-1}$ | $CH_4$ % | $C_2$ = % | $C_2$ ratio O/(O + P) | $C_3$ = % | $C_3$ ratio O/(O + P) |
| 4 | 42 | 87 | 3.8 | 4.5 | 3.6 | 0.70 | 6.0 | 0.92 |
| 19 | 29 | 93 | 5.6 | 7.2 | 2.8 | 0.45 | 6.7 | 0.88 |

[a]FTS conditions: 340° C., 20 bar, CO:$H_2$ = 1 and 30, 000 $h^{-1}$.

Table 10 compares the catalytic performance obtained from the pyrolysis of MIL-100 (Fe) and Basolite F-300. Basolite F-300 has similar composition of MIL-100 (Fe), but unknown crystal structure due to the high amorphous nature. The catalytic results demonstrate that both precursors result in active and selective FTS catalysts, albeit that the material made from the commercial MOF is more selective to lower olefins and produces less methane.

EX 10 (NA PROMOTED; NON-WASHED MIL-100 (FE))

Replicate Ex9. With Changes to Prepare Catalyst 20.
Subject non-washed MIL-100 (Fe) to incipient wetness impregnation (incipient wetness volume~1.2 ml/g) with an aqueous solution of sodium nitrate in an amount sufficient to provide respective sodium loadings of 0.05 wt % for catalyst 25. Non-washed means that the MOF is as synthesized and still contains solvent and linker molecules inside the pores.
Pyrolyze the resultant material at 500° C. for 8 hours under nitrogen atmosphere, using a heating rate of 2° C. $min^{-1}$ to yield a promoted catalyst. Table 11 below summarizes catalyst test results together with Catalyst 19.
Catalysts 20 has a Fe content of 38 wt %.

TABLE 11

Catalytic performance for Catalysts 19-20 after 90 h TOS: Conversion of CO (X, %), selectivity of methane (CH$_4$) and C2-C3 olefins (S, expressed as Cmol. %) and fraction of Olefins for C$_2$ and C$_3$ hydrocarbons.

| | | | | FTS performance after 90 h TOS[a] | | | | |
|---|---|---|---|---|---|---|---|---|
| Catalyst | MOF wash step | Fe wt % | X % | FTY $10^{-4}$ mol $g_{Fe}^{-1}$ $s^{-1}$ | CH$_4$ % | C$_2$ = % | C$_2$ ratio O/(O + P) | C3 = % | C$_3$ ratio O/(O + P) |
| 19 | Yes | 29 | 5.60 | 7.2 | 2.1 | 0.45 | 6.7 | 0.88 |
| 20 | No | 38 | 4.44 | 8.6 | 2.3 | 0.39 | 6.9 | 0.84 |

[a]FTS conditions: 340° C., 20 bar, CO:H$_2$ = 1 and 30, 000 h$^{-1}$.

Table 11 demonstrates that Catalyst 20 does not differ significantly in terms of catalytic performance in comparison with Catalyst 19. This may simplify the synthesis of MOF and therefore minimize the manufacture costs as the washing step in the preparation of the MOF (removal of solvent and/or linker molecules) is not required.

COMPARATIVE EXAMPLE (CEX A) (NON-PROMOTED; MIL-101 AS PRECURSOR)

For catalyst 21 use MIL-101 (Fe) as Fe MOF precursor. Pyrolyze MIL-101 (Fe) at 500° C. for eight (8) hours at a rate of two (2) ° C. per minute.

Electron Microscopy analysis of catalyst 21 demonstrate that the dispersion of Fe is very similar to that of Catalyst 9 (mean particle size~3.6 nm).

Premix 10 milligrams (mg) (approximately 20 microliters (μL)) of the catalyst sized to 80-100 mesh (177 μm to 150 micrometers (μm)) with 100 μL of SiC to yield premixed samples and load the premixed samples into a tubular micro-reactor (internal diameter 4 mm, length 16 millimeters). Before exposing the premixed samples to syngas, activate the samples under hydrogen atmosphere (3 bar (3×10$^5$ pascals (Pa))/425° C./3 h). Allow reactor temperature to decrease to 340° C., then change atmosphere within the reactor to a mixture of hydrogen and carbon monoxide (CO 45 vol. %, H$_2$ 45 vol. % and He 10 vol. %, all vol % being based upon combined volume of CO, H$_2$ and He) and raise reactor pressure to 20 bar (2×10$^6$ Pa). Conduct catalytic testing at a syngas flow rate of 10 cubic centimeters per minute at standard temperature and pressure (cm$^3$/min (STP)) over a period of 100 hours (hrs). Catalyst performance test results are summarized in Table 12.

olefins production. For all catalysts, active and selective FTS catalysts are obtained.

CEX B (NON-PROMOTED; ADDITION OF EXTRA CARBON TO THE MATERIAL)

For each of Catalysts 22-24, Basolite™ F-300 as a Fe-MOF precursor. Add an amount of furfuryl alcohol ("FA") via incipient wetness impregnation as a means of altering Fe/C ratio of the precursor. Following impregnation, the impregnated precursors are heated to a temperature of of 80° C. and 150° C. at a rate of two (2) ° C. per minute and maintained at that temperature in a nitrogen atmosphere for, respectively, 14 hours and six (6) hours to effect polymerization of the FA. Following polymerization, carbonize the precursors for eight (8) hours under a nitrogen atmosphere at a temperature of 500° C. Table 13 below shows volume percentage (vol %) of FA, weight percent (wt %) Fe and Fe particle diameter in nanometers for each of Catalysts 22-24.

TABLE 13

Fe loading and average particle size of iron obtained for Catalysts 22-24.

| Catalyst | FA vol. % | Fe wt % | $d_{Fe}$ nm |
|---|---|---|---|
| 22 | 15 | 32 | 2.5 |
| 23 | 30 | 27 | 2.6 |
| 24 | 50 | 25 | 3.3 |

Electron microscopy analysis shows that Catalysts 22-24 are present as well-dispersed spherical nano-particles (mean

TABLE 12

Average particle size, Fe loading and catalytic performance for Catalysts 9-21 after 90 h TOS: Conversion of CO (X, %), iron time yield (FTY, mol $g_{Fe}^{-1}$ s$^{-1}$), selectivity of methane (CH$_4$) and C2-C3 olefins (expressed as Cmol. %) and fraction of Olefins for C$_2$ and C$_3$ hydrocarbons.

| | | | | FTS performance after 90 h TOS[a] | | | | |
|---|---|---|---|---|---|---|---|---|
| Catalyst | $d_{Fe}$ nm | Fe wt % | X, % | FTY $10^{-4}$ mol $g_{Fe}^{-1}$ s$^{-1}$ | CH$_4$ % | C2 = % | C$_2$ ratio O/(O + P) | C3 = % | C$_3$ ratio O/(O + P) |
| 9 | 3.6 | 38 | 76 | 3.55 | 15.5 | 1.1 | 0.13 | 6.2 | 0.64 |
| 21 | >3 | 42 | 65 | 2.90 | 17.0 | 1.4 | 0.11 | 5.7 | 0.54 |

[a]FTS conditions: 340° C., 20 bar, CO:H$_2$ = 1 and 30, 000 h$^{-1}$.

The catalytic data shown in Table 12 demonstrates that the type of MOF determines the Fe loading and iron particle size. The particle size has an important role on the FTS catalytic performance, namely chain growth probability and Fe particle size that ranges from 2.5 to 3.3 nm) embedded in a carbon matrix. In situ Mossbauer spectroscopy enables identification and quantification of type of iron phase types formed during the synthesis. After pyrolysis 26% of the iron species are in the form of FeC$_x$ phase. Following syngas exposure, 89% of the iron species are present as active Hägg carbide ($\chi$-Fe$_5$C$_2$) for FTS.

Premix 10 mg of each catalyst sized to 80-100 mesh with 100 µL of SiC to yield premixed samples and load the premixed samples into a tubular micro-reactor (internal diameter 4 mm, length 16 millimeters). Before exposing the premixed samples to syngas, activate the samples under hydrogen atmosphere (3 bar (3×10$^5$ pascals (Pa))/425° C./3 h). Allow reactor temperature to decrease to 340° C., then change atmosphere within the reactor to a mixture of hydrogen and carbon monoxide (CO 45 vol. %, H$_2$ 45 vol. % and He 10 vol. %, all vol % being based upon combined volume of CO, H$_2$ and He) and raise reactor pressure to 20 bar (2×10$^6$ Pa). Conduct catalytic testing at a syngas flow rate of 10 cubic centimeters per minute at standard temperature and pressure (cm$^3$/min (STP)) over a period of 100 hours (hrs). Table 14 below summarizes catalyst test results.

TABLE 14

Catalytic performance for Catalysts 22-24 after 4 and 100 h TOS: Conversion of CO (X, %), iron time yield (FTY, mol g$_{Fe}^{-1}$ s$^{-1}$), selectivity of methane (CH$_4$) and C2-C3 olefins (expressed as Cmol. %) and fraction of Olefins for C$_2$ and C$_3$ hydrocarbons.

| | Performance after 4 h TOS$^a$ | | | Performance after 100 h TOS$^a$ | | | | | |
|---|---|---|---|---|---|---|---|---|---|
| Catalyst | X % | CH$_4$ % | C2 ratio O/(O + P) | C3 ratio O/(O + P) | X % | FTY 10$^{-4}$ mol g$_{Fe}^{-1}$ s$^{-1}$ | CH$_4$ % | C2= % | C2 = ratio O/(O + P) | C3 = % | C3 ratio O/(O + P) |
| 22 | 69 | 14.2 | 0.2 | 0.72 | 75 | 4.24 | 14.8 | 1.5 | 0.17 | 7.7 | 0.68 |
| 23 | 60 | 14.6 | 0.2 | 0.70 | 73 | 4.89 | 14.6 | 1.5 | 0.17 | 7.4 | 0.69 |
| 24 | 59 | 13.8 | 0.2 | 0.72 | 72 | 5.21 | 14.7 | 1.5 | 0.14 | 7.6 | 0.65 |

$^a$ $^a$FTS conditions: 340° C., 20 bar, CO:H$_2$ = 1 and 30,000 h$^{-1}$.

The data in Table 14 show the high stability and activity of Catalysts 22-24 after 100 hours time on stream (TOS). The product distribution does not differ significantly in catalysts 22-24 and there is no appreciable catalyst deactivation over the applied TOS.

CEX C (NON PROMOTED; CITRATE PRECURSOR)

Replicate CEx B, but substitute a solution of ammonium iron citrate, citric acid and an aqueous ammonia solution (25 volume percent ammonia, based upon total solution volume) for the BTC (Catalyst 25). Summarize catalyst performance test results in Table 15 below.

CEX D (NON PROMOTED; CITRATE PRECURSOR)

Replicate CEx F, but dissolve the ammonium iron citrate in ethylene glycol together with citric acid (Catalyst 26). Summarize catalyst performance test results in Table 15 below.

CEX D (NON PROMOTED; CITRATE PRECURSOR WITH ADDITION OF EXTRA CARBON TO THE MATERIAL)

Replicate CEx F, but pyrolyze a mixture of poly(vinyl alcohol) ((C$_2$H$_4$O)$_n$, PVA) and iron citrate (FeC$_6$H$_5$O$_7$) (Catalyst 27). Summarize catalyst performance test results in Table 15 below.

TABLE 15

Iron loading, average particle size of Fe on Catalysts 6, 23, 25-27 carbon conversion (X, %), iron time yield (FTY, mol CO consumed/g Fe/s) and methane selectivity (Cmol %) after 90 h TOS.

| | | | FTS performance after 90 h TOS$^a$ | | |
|---|---|---|---|---|---|
| Catalyst | Fe wt % | d nm | X % | FTY 10$^{-4}$ mol g$^{-1}$ s$^{-1}$ | CH$_4$ % |
| 9 | 38 | 3.6 | 76 | 3.6 | 15.5 |
| 23 | 27 | 2.5 | 73 | 5.2 | 15.0 |
| 25 | 35 | ~20 | 7 | 0.33 | 13 |
| 26 | 27 | 10-35 | 3 | 0.14 | 24 |
| 27 | 17 | n.d. | 33 | 3.4 | 17 |

$^a$FTS conditions: 340° C., 20 bar, CO:H$_2$ = 1 and 30,000 h$^{-1}$.
n.d. not determined The data in Table 15 show that the reference materials (Catalysts 23-25) with similar Fe loadings but not obtained from a MOF starting component have an intrinsic catalytic activity that is one order of magnitude lower than MOF based catalysts as represented by reference Catalysts 6 and 23.

What is claimed is:

1. A process for preparing a Fischer-Tropsch Synthesis catalyst comprising two steps as follows: a) impregnating an iron based metal organic framework with a solution of a promoter element selected from alkali metals and alkaline earth metals; and b) thermally decomposing the metal organic framework at a temperature within a range of from 400° C. to 1000° C., under an inert gaseous atmosphere to yield a catalyst that is a porous carbon matrix having embedded therein a plurality of discrete aliquots of iron carbide, the discrete aliquots having a mean particle size of from greater than 0 nanometer to no more than 100 nanometers and being present in a total amount within a range of from 10 weight percent to no more than 60 weight percent, based upon total catalyst weight.

2. The process of claim 1, wherein the iron based metal organic framework consists of a carboxylate metal organic framework selected from a group consisting of iron-1,3,5-benzenetricarboxylate, iron 1,4 benzenedicarboxylate, iron fumarate, and iron azobenzenetetracarboxylate.

3. The process of claim 1, wherein the inert gaseous atmosphere comprising at least one gas selected from a group consisting of nitrogen, helium and argon.

4. The process of claim 1, further comprising a step that precedes step b) wherein the iron based metal organic framework is impregnated with an organic solvent solution or aqueous solution of a polymerizable additional carbon source and the polymerizable additional carbon source is polymerized under an inert gaseous atmosphere at a temperature within a range of from 50° C. to 200° C. for a period of time within a range of from one hour to forty eight hours to yield a polymer-modified iron based metal organic framework.

5. The process of claim 4, wherein the organic solvent is at least one solvent selected from a group consisting of alcohols, ethers, esters, ketones and aldehydes, and the polymerizable additional carbon source is furfuryl alcohol, the furfuryl alcohol being present in an amount within a range of from greater than zero volume percent to less than or equal to 100 volume percent, each volume percent being based upon total alcohol solution volume.

6. The process of claim 4, wherein the polymerizable additional carbon source is selected from pyrrole and sucrose.

7. The process of claim 4, wherein the organic solvent is an alcohol selected from a group consisting of methanol, ethanol, propanol, butanol and mixtures thereof.

8. The process of claim 4 wherein the temperature is within a range of from 80° C. to 150° C. and the time is less than or equal to 24 hours.

9. The process of claim 1, wherein the promoter element is an alkali metal, an alkaline earth metal or a combination of two or more of the preceding, and wherein the promoter is present in an amount that yields an promoter metal/iron atomic ratio within a range of from greater than zero to less than or equal to 0.2.

10. The process of claim 1 wherein the metal organic framework is applied as synthesized.

11. The process of claim 1 wherein the catalyst is applied in Fischer-Tropsch Synthesis without prior activation.

12. A process for preparing a Fischer-Tropsch Synthesis catalyst comprising two steps as follows: a) thermally decomposing an iron based metal organic framework at a temperature within a range of from 400° C. to 1000° C., under an inert gaseous atmosphere; and b) impregnating the iron based metal organic framework with a solution of a promoter element selected from alkali metals and alkaline earth metals to yield a catalyst that is a porous carbon matrix having embedded therein a plurality of discrete aliquots of iron carbide, the discrete aliquots having a mean particle size of from greater than 0 nanometer to no more than 100 nanometers and being present in a total amount within a range of from 10 weight percent to no more than 60 weight percent, based upon total catalyst weight.

13. The process of claim 12, wherein the iron based metal organic framework consists of a carboxylate metal organic framework selected from a group consisting of iron-1,3,5-benzenetricarboxylate, iron-1,4-benzenedicarboxylate, iron fumarate, and iron azobenzenetetracarboxylate.

14. The process of claim 12, wherein the inert gaseous atmosphere comprising at least one gas is selected from the group consisting of nitrogen, helium and argon.

15. The process of claim 12, further comprising a step that precedes step a) wherein the metal organic framework is impregnated with an organic solvent solution or aqueous solution of a polymerizable additional carbon source and the polymerizable additional carbon source is polymerized under an inert gaseous atmosphere at a temperature within a range of from 50° C. to 200° C. for a period of time within a range of from one hour to forty eight hours to yield a polymer-modified iron based metal organic framework.

16. The process of claim 15, wherein the organic solvent is at least one solvent selected from a group consisting of alcohols, ethers, esters, ketones and aldehydes, and the polymerizable additional carbon source is furfuryl alcohol, the furfuryl alcohol being present in an amount within a range of from greater than zero volume percent to less than or equal to 100 volume percent, each volume percent being based upon total alcohol solution volume.

17. The process of claim 15, wherein the polymerizable additional carbon source is selected from pyrrole and sucrose, wherein the organic solvent is an alcohol selected from a group consisting of methanol, ethanol, propanol, butanol and mixtures thereof, and wherein the temperature is within a range of from 80° C. to 150° C. and the time is less than or equal to 24 hours.

18. The process of claim 12, wherein the promoter element is an alkali metal, an alkaline earth metal or a combination of two or more of the preceding, and wherein the promoter is present in an amount that yields a promoter metal/iron atomic ratio within a range of from greater than zero to less than or equal to 0.2.

19. The process of claim 12, wherein the iron based metal organic framework is applied as synthesized.

20. The process of claim 12, wherein the catalyst is applied in Fischer-Tropsch Synthesis without prior activation.

* * * * *